G. W. PECK.
Fastening for Egg-Carriers.

No. 221,859. Patented Nov. 18, 1879.

WITNESSES:
C. Neveux
C. Sedgwick

INVENTOR:
G. W. Peck
BY Munn & Co.
ATTORNEYS.

UNITED STATES PATENT OFFICE.

GEORGE W. PECK, OF OMAHA, NEBRASKA.

IMPROVEMENT IN FASTENINGS FOR EGG-CARRIERS.

Specification forming part of Letters Patent No. 221,859, dated November 18, 1879; application filed May 6, 1879.

*To all whom it may concern:*

Be it known that I, GEORGE WILLIAM PECK, of Omaha, in the county of Douglas and State of Nebraska, have invented a new Improvement in Egg-Carriers, of which the following is a specification.

Figure 1:
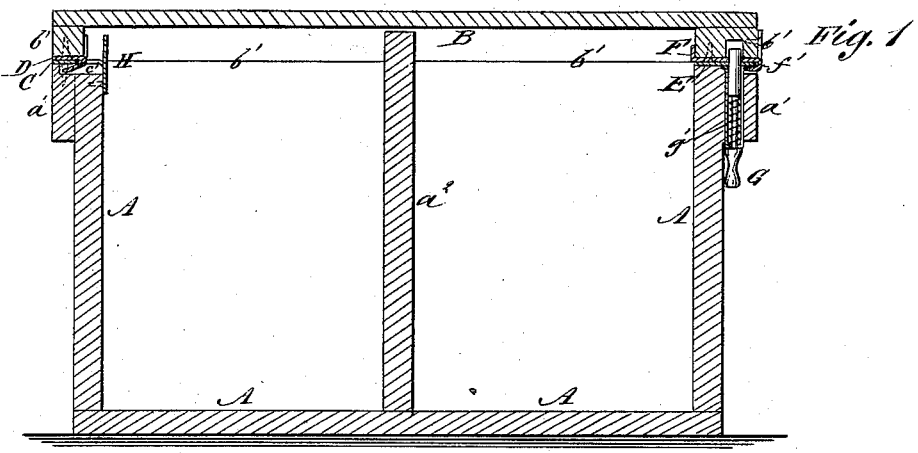
Figure 2:
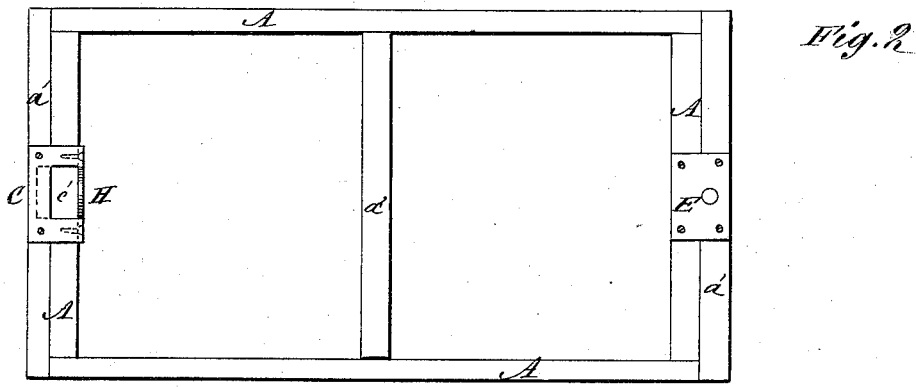
Figure 3:
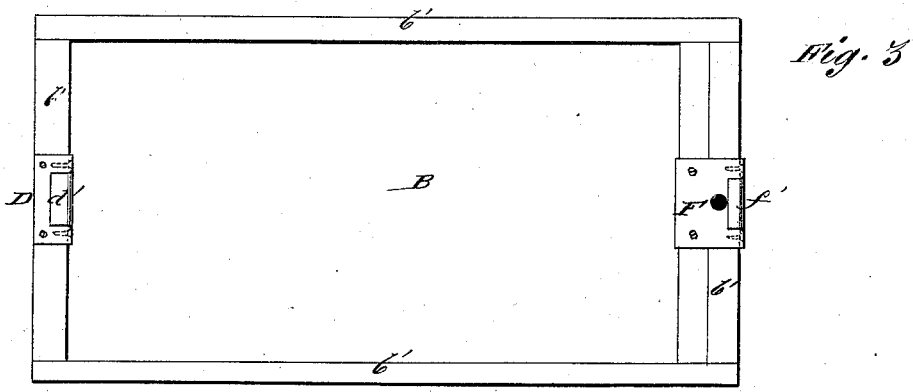

Figure 1 is a vertical longitudinal section of my improved egg-carrier. Fig. 2 is a top view of the body of the box, the cover being removed. Fig. 3 is an under-side view of the cover.

Similar letters of reference indicate corresponding parts.

The object of this invention is to furnish an improved box or crate designed especially for carrying eggs, but which may be used for other purposes, which shall be simple in construction and convenient in use.

The invention consists in an egg-carrier in which the cover is made with cleats or flanges to rest upon the edge of the body, and the said body is made with a cross-partition projecting above its edge to pass in between the side cleats of the cover and rest against the said cover; in the combination of the two socket-plates and the two hook-plates with the ends and end cleats of the body and the end cleats of the cover; in the combination of the spring bolt or catch with the forward end cleat of the body, the forward socket and hook plates, and the forward end cleat of the cover; and in the combination of the stop-plate with the rear end of the body, the rear socket and hook plates, and the rear cleat of the cover, as hereinafter fully described.

A represents the body of the carrier, to the upper part of the ends of which are attached cross-cleats $a'$ to give a better support to the fastenings and to serve as handles in handling and carrying the carrier. The body A is divided into two compartments by a cross-partition, $a^2$, the top of which rises above the top edge of the said body A for the cover B to rest upon, and to hold the said cover against any lateral movement.

B is the cover, which has cleats or flanges $b'$ attached to the lower side of its side and end edges to fit and rest upon the top edges of the side and ends of the body A.

To the edge of the rear end of the body A is attached a plate, C, which has a slot, $c'$, formed through it, to receive the hook $d'$ formed upon the plate D, attached to the edge of the rear end cleat or flange, $b'$, of the cover B. The edge of the body A below the plate C is recessed to form a space or socket for the hook $d'$ of the plate D.

To the edge of the forward end of the body A is attached a plate, E, and the said edge is recessed below the forward part of the plate E to form a space or socket to receive the hook $f'$ formed upon the outer edge of the plate F attached to the forward end cleat, $b'$, of the cover B. With this construction the cover B is put on by moving it forward so far that the hook $d'$ of the hook-plate D will enter the slot $c'$ of the socket-plate C, and the said cover B is then pushed back, causing the hooks $d'$ $f'$ of the plates D F to engage with the plates C E.

G is a bolt or catch which passes up through a hole in the forward end cleat, $a'$, of the body A, through holes in the two plates E F, and into a hole in the forward cleat, $b'$, of the cover B. The bolt or catch G is held up by a spring, $g'$, attached to it. With this construction the cover B is removed from the body A by drawing down the spring bolt or catch G $g'$, drawing the said cover B forward to withdraw the hooks $d'$ $f'$ from the plates D F, and then raising it from the said body A.

To the rear end of the body A is attached a stop-plate, H, which projects above the edge of the said body A for the rear cleat of the cover B to strike against to prevent the said cover from being drawn so far forward that its rear cleat, $b'$, would strike against the eggs and break them. The stop-plate H also serves as a guide in putting on the cover B.

Having thus described my invention, what I claim as new, and desire to secure by Letters Patent, is—

1. An egg-carrier, in which the cover B is made with cleats or flanges $b'$ to rest upon the edge of the body A, and the said body A is made with a cross-partition, $a^2$, projecting above its edge to pass in between the side cleats of the cover B and rest against the said cover, substantially as herein shown and described.

2. The combination of the socket-plates C E and the hook-plates D F with the ends and end cleats of the body A and the end cleats of the cover B, as herein shown and described.

3. The combination of the spring bolt or catch G with the end cleat $a'$ of the body A, the socket and hook-plates E F, and the end cleat $b'$ of the cover B, substantially as herein shown and described.

4. The combination of the stop-plate H with the rear end of the body A, the socket and hook-plates C D, and the rear cleat, $b'$, of the cover B, substantially as herein shown and described.

GEORGE WM. PECK.

Witnesses:
 DEXTER L. THOMAS,
 DANIEL P. ANGELL.